March 31, 1970  J P. KRUPP, JR  3,503,097
METHOD OF AND APPARATUS FOR PERFORATING FILMS OF
THERMOPLASTIC MATERIAL
Filed Nov. 13, 1967  2 Sheets-Sheet 1

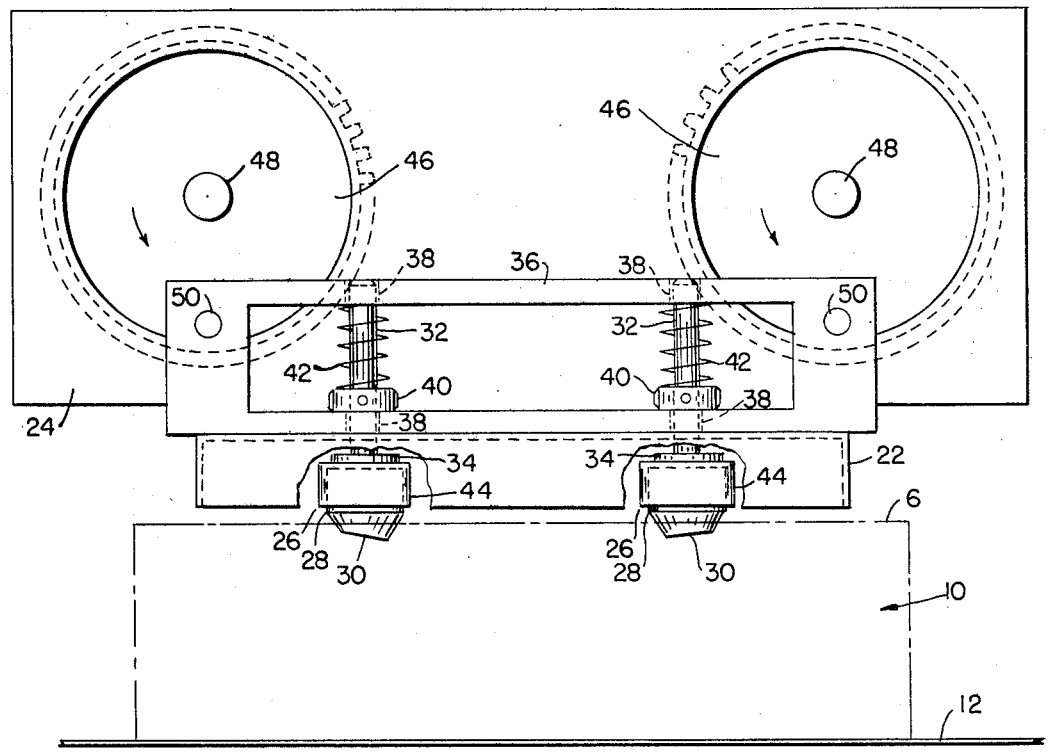
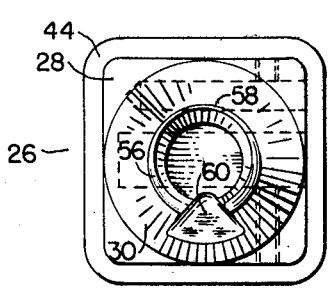
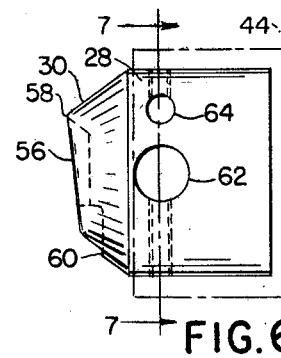
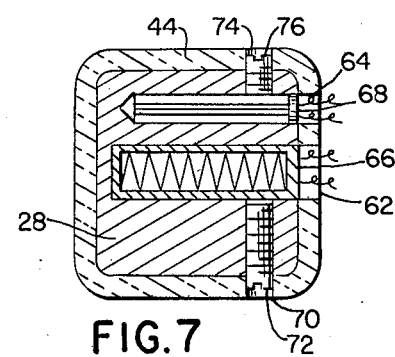
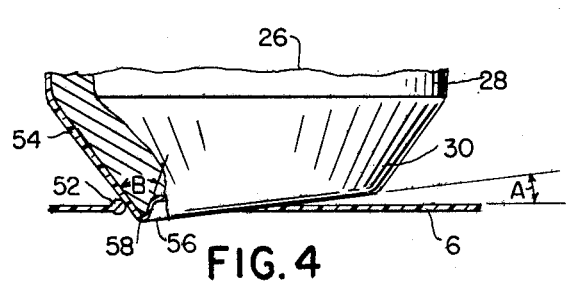
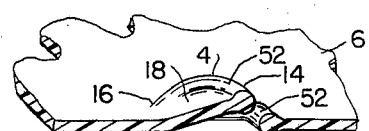

United States Patent Office 3,503,097
Patented Mar. 31, 1970

3,503,097
METHOD OF AND APPARATUS FOR PERFORATING FILMS OF THERMOPLASTIC MATERIAL
J Paul Krupp, Jr., Mechanicsville, Va., assignor to Reynolds Metals Company, Richmond, Va., a corporation of Delaware
Filed Nov. 13, 1967, Ser. No. 682,174
Int. Cl. B26d 7/10; B29c 17/10
U.S. Cl. 18—1
12 Claims

ABSTRACT OF THE DISCLOSURE

Apparatus for perforating a film of thermoplastic material which is heat shrunk about a plurality of containers to form package carrier. A novel heated punch is used to form finger-sized horseshoe-shaped apertures which facilitate lifting the package. A tongue of thermoplastic material left in the film aperture is useful as a pull tab for opening packages wrapped in the film. During perforations, the film is subjected to a controlled melting to provide a reinforcing bead or thickened section at the perimeter of the aperture.

This invention relates to apparatus for perforating a film of thermoplastic material, and in particular to apparatus capable of selectively reinforcing thermoplastic film at the perimeter of the perforation during the perforating process.

One of the reasons for perforating thermoplastic film is to provide a simple means for taking positive hold of the film. One or more fingers can be passed through conveniently placed apertures in the film to facilitate an easy grip. Should a heavy load be hoisted along with the film, as in the case where the film has been heat shrunk around a plurality of containers to provide an inexpensive package, it is necessary that the film be of sufficient strength so as not to tear at the gripping perforations during the lifting operation. One way to prevent such tearing is to provide a thickened area or bead in the film along the portion of the perimeter of the gripping perforation which will experience tearing stresses.

The finger gripping apertures in a heat shrunk envelope surrounding a plurality of containers, such as cans, can be designed with further utility. If the perforation is made in the form of "U" or horseshoe shape a small tongue of thermoplastic film is left in the aperture. This tongue can be used as a pull or rip tab for initiating a tear in the heat shrunk package for the purpose of opening it to permit removal of its contents.

For purposes of this application a horseshoe is herein defined as having both a "heel" portion and a "toe" portion. The toe portion is taken to be the forward U-shaped portion of the shoe, while the heel portion is designated as the area of the tips of the shoe legs at its open end. When a horseshoe shaped perforation is used for both package carrying and package opening purposes it is usually placed so that the toe portion of the perforation bears the carrying stresses. It becomes apparent then that the problem in the construction of such a perforation if it is to be successful, is to make its toe portion of sufficient strength to withstand carrying stresses without tearing, and to make its heel portion of such strength that it can be torn at will by pulling on the tab remaining in the perforated area. The apparatus of this invention has been developed to provide a simple solution to this problem. A heated punch of novel construction is used to form the horseshoe shaped perforation in the thermoplastic film and to reshape simultaneously the film in the area of the perforation. This reshaping provides a reinforcing bead or thickened section at the perimeter of the perforation which increases in thickness as it proceeds from the heel portion to the toe portion of the horseshoe shaped aperture.

The apparatus of this invention comprises at least one punch, means for heating the punch to a predetermined temperature and means for bringing the punch into engagement with the thermoplastic film to be perforated for a predetermined length of time. The punch itself comprises a punch head which is designed to carry the heating means, and a substantially annular perforating surface having a leading perforating edge located essentially in one plane. The perforating surface, which is described as being roughly crater shaped, is mounted on the punch head. The apparatus is so constructed that during the perforating operation the plane containing the leading edge of the crater shaped perforating surface is offset at an angle of less than 10 but more than 3 degrees with respect to the plane containing the thermoplastic film.

When it is desired to form a reinforced horseshoe shaped perforation, the punch perforating surface is designed so that it resembles roughly a horseshoe shaped crater. This perforating surface is attached to the punch head in such a manner that the toe portion of the horseshoe shape is the first part of that surface to engage the thermoplastic film during aperture formation.

The punch is preferably insulated against heat loss and the perforating surface is coated with a release agent to prevent build up of thermoplastic material thereon. Two longitudinally spaced punches may be operated simultaneously with the toe portions of their horseshoe shaped perforating surfaces pointed toward one another to provide two apertures in a single piece of thermoplastic film. Such apertures are useful for gripping packages wrapped with the film.

The punch is yieldably mounted to the moving means to insure perforation only of the film and not, for instance, the head of a container below the film which the punch might strike by misalignment of the punch actuating mechanism or improper feeding of the containers.

A further improvement comprises blunting of the apex or leading edge of a horseshoe shaped perforating surface at its toe portion, and increasingly blunting that apex as it approaches the horseshoe's heel portion. This construction provides a controlled melting of the thermoplastic film thereby permitting control of the strength along the periphery of the finger hole.

In addition, the apparatus of this invention may be designed to follow and perforate a moving sheet of thermoplastic film and then to return to its point of origin to repeat the operation.

The unique features of the present invention will be more readily understood by reference to the following detailed description and by reference to the accompanying drawings, wherein:

FIG. 2 is a front view of the apparatus of FIG. 1, partly disassembled, and with certain parts broken away.

FIG. 3 is a perspective view of an enlargement of a fragment of film of thermoplastic material which has been perforated by the apparatus of this invention, shown partly in cross section.

FIG. 4 is a partial front view of a perforating punch of this invention shown partly in cross section.

FIG. 5 is a bottom view of one embodiment of a perforating punch head assembly of this invention.

FIG. 6 is a side view of the punch head assembly of FIG. 5.

FIG. 7 is a cross sectional view of the punch assembly of FIG. 6 taken along line 7—7 of FIGURE 6.

Figure 1:
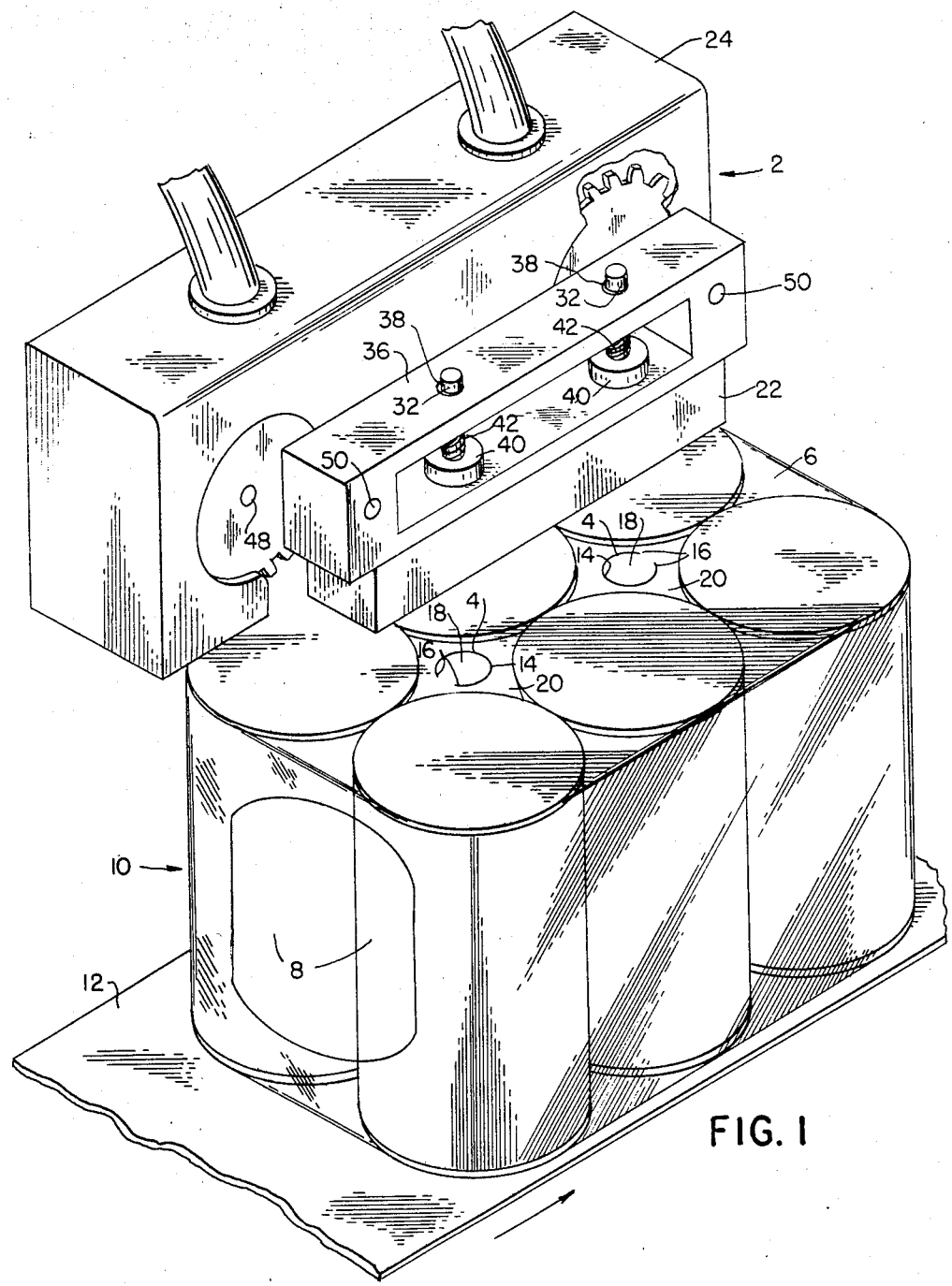
FIG. 1 is a perspective view of one embodiment of this invention after it has been used to perforate finger holes in the top surface of the heat shrunk enveloping skin of a package of six containers.

Referring now to FIG. 1 there is illustrated a perspective view of one embodiment of this invention in position after suitable apparatus, indicated generally at 2, has formed perforations 4 in a film of thermoplastic material 6 which has been heat shrunk about a number of containers 8 to secure them together into a package indicated generally at 10. The containers 8, shown as cans in this figure, are carried by any suitable conveyor means 12. This conveyor may be stopped intermittently to permit operation of apparatus 2, but in the preferred form apparatus 2 may be designed to move in synchronism with package 10 to perforate while in continuous motion, and then return to its point of origin to enable it to repeat the cycle with a subsequent package.

The perforations 4 are preferably horseshoe shaped and are illustrated to have completely penetrated thermoplastic film 6 so as to provide a toe portion 14 and a heel portion 16. This construction leaves a free tab 18 of thermoplastic film. The toe portions 14 of perforations 4 are pointed toward one another. The perforations 4 have been located in film 6 so that they are above the interstices 20 formed between containers 8 in package 10. This arrangement allows perforations 5 to be used for gripping and carrying package 10 by permitting one's fingers to be inserted through the apertures in the film. The arrangement also allows tabs 18 to be used as a means for initiating a tear in film 6 for the purpose of opening package 10 by merely pulling the tabs 18 toward opposite ends of said package.

In FIGURES 1 and 2, the means for moving the perforating apparatus into engagement with the thermoplastic film is shown as a gear box 24, although any suitable driving means may be used.

FIGURE 2 shows the apparatus of FIG. 1 in greater detail. Two punches 26 are visible, each having a punch head 28 and a perforating surface 30 attached to the punch head. Rods 32 attached to mounting plates 34 atop punch heads 28 connect the punches 26 with their support housing 36. Rods 32 pass through holes 38 in housing 36 which are of a slightly larger diameter than rods 32. Collars 40 adjustably secured to rods 32 limit the extent of relative motion between housing 36 and rods 32. Compression springs 42 encircle rods 32 and by acting upon housing 36 and collar 40 urge punches 26 away from housing 36. The compressive force upon springs 42 is adjusted to insure that punches 26 will perforate only the thermoplastic film 6 of package 10 (both shown in phantom) and not the top of any container 8 which might be struck in error. Should a punch strike a container top, spring 42 will yield to prevent puncturing of the container.

Each punch head 28 is insulated against heat loss by insulation 44 carried on the punch itself and by a heat insulating shroud 22 carried by housing 36. The use of the heat insulating shroud 22 is optional.

The device shown in FIG. 2 is designed to perforate the thermoplastic skin 6 of package 10 while package 10 is in motion on conveyor 12. To accomplish this, apparatus is provided to position housing 36 properly with its punches 26 during the perforating step. A stationary gear box 24 contains two gears 46 capable of rotation about their axles 48. Pins 50 projecting from surfaces of gears 46 connect housing 36 with gear box 24. Pins 50 are positioned on gears 46 and connected to housing 36 in such a manner as to maintain both punches 26 at all times equidistant from the top of package 10. Assuming both pins 50 to be originally in a 9 o'clock position with respect to gears 46, and package 10 to be conveyed from left to right by conveyor 12, the operation of the apparatus will be as follows during identical counterclockwise rotation of gears 46. Housing 36 will move downwardly and to the right, picking up speed in the horizontal direction. When pins 50 reach the six o'clock position depicted in FIG. 2, the horizontal velocity of housing 36 will equal that of package 10 and punches 26 will be engaged in perforating film 6. Further rotation of gears 46 will continue to carry housing 36 to the right and will lift punches 26 away from package 10. As pins 50 rotate from a 3 o'clock position to the starting 9 o'clock position, the housing 36 will return to the left to be ready to repeat the perforating operation with the next package to come along on conveyor 12. Thus the motion of each punch 26 is continuous as it moves in an orbital path in synchronism with each package 10 on conveyor means 12.

FIGURE 3 shows in perspective a cross section of a fragment of thermoplastic film 6 which has been perforated in accordance with one embodiment of this invention. Half of a horseshoe shaped perforation 4 is visible including half of a tab 18. Reinforcing thickened areas or beads 52 have been formed in the thermoplastic film 6 at the perimeters of perforation 4 and tab 18. These beads 52 increase in thickness as they proceed from the heel portion 16 to the toe portion 14 of horseshoe shaped perforation 4. The formation of beads 52 has caused film 6 and tab 18 to shrink in the immediate area of perforation 4 leaving a horseshoe shaped void between the two.

FIGURE 4 is a perspective view of a portion of a punch of this invention shown partly in cross section. The perforating surface 30 of the punch 26 is conical and has been designed to produce the reinforced perforation 4 of FIGURE 3. The conical perforating surface 30 may be described as being roughly toroidal in shape. A toroid simulating perforating surface 30 could be generated by the rotation of a triangle about the center of gravity of the shape to be created. The intersection of two sides of the three-sided surface generated at the common apex of said two sides would form the leading edge 56 of perforating surface 30, while the third side would be attached to the punch head 28. Perforating surface 30 can similarly be considered to be roughly crater shaped (seen better in FIGURE 5). The walls of the crater intersect at an angle B at the leading edge 56 of the perforating surface. This perforating edge 56 is designed to lie in a plane which is offset from the plane containing the film of thermoplastic material 6 by an angle A. A coating 54 of release agent has been provided upon perforating surface 30 to prevent the buildup of thermoplastic material thereon.

In operation, punch head 28 is heated to a predetermined temperature. This temperature is dependent upon the particular thermoplastic material to be perforated and upon the length of time allowed for forming each perforation, and could easily be determined for a particular set of conditions by anyone skilled in the art of shaping plastic materials. Heat is transferred to punch head 28 to perforating surface 30, keeping both at nearly the same temperature.

During perforation the angle A between the plane containing leading perforating edge 56 and the plane of the thermoplastic film 6 is maintained at less than 10 degrees and more than 3 degrees, preferably at 5 degrees. Thus there develops a point 58 along leading perforating edge 56 which is first to contact film 6 during the movement of punch 26 in a direction relatively perpendicular to the plane of film 6. Upon contact the heat from punch 26 begins to soften and then melts the contacted portion of film 6 in a controlled manner along conical surface 30. As punch 26 continues to travel through film 6 other segments of leading edge 56 come into contact with said film and causes progressive controlled softening and melting. These softened and melted portions of film 6 tend to retreat as the conical surface 30 penetrates deeper thereby forming the reinforcing beads 52. The cross-sectional conical or wedge shape of perforating surface 30 aids in the formation of beads 52 by urging softened and melted thermoplastic film material laterally out of the way of the oncoming punch 26. It has been found that an angle B of about 68 degrees makes a satisfactory wedge for these purposes. Because of the longest contact time that film 6 experiences with perforating surface 30 is at the point touched by initial contact point 58, the bead 52 formed will be the largest or thickest there. The thickness of bead 52 will decrease proceeding from that point around the perimeter of perforation 4 due to lower punch-film contact times.

FIGURE 5 is a bottom view of one embodiment of the punch of the apparatus of this invention. Insulation 44 surrounds punch head 28. Perforating surface 30 is crater shaped and its perforating edge 56 is discontinuous by virtue of a triangularly shaped recess 60 which permits the formation of a horseshoe-shaped hole. Film perforated with such a punch will have a tab 18 of film material formed in the perforated aperture (FIG. 3).

The initial contact point 58 in the punch 26 of FIG. 5 is located in the toe portion of the conical perforating surface 30. Leading edge 56 of surface 30 has been blunted slightly at initial contact point 58 and to an increasing degree as edge 56 approaches the heel portion of conical perforating surface 30. This blunting has been observed to improve the formation of a bead 52 of varying thickness, possibly due to the resulting decrease in punch-film contact time at the heel portions of said perforating surface.

FIGURE 6 shows a side view of the punch 26 of FIG. 5. A hole 62 has been provided in punch head 28 for reception of a heating element. A second hole 64 has similarly been provided to receive a temperature sensing device. Heat insulation 44 is shown in phantom.

FIGURE 7 is a cross sectional view taken along line 7—7 of the punch of FIG. 6. An electric heating element 66 has been inserted in hole 62 and a thermocouple 68 in hole 64. Screws 72 and 76 set in threaded holes 70 and 74 maintain heating element 66 and thermocouple 68 in position. In one particular usage the apparatus of FIGS. 1 and 2 fitted with a punch of the type shown in FIG. 5 was used to make horseshoe-shaped perforations of the type shown in FIG. 3. Two finger sized perforations were made in each of the tops of the enveloping heat shrunk thermoplastic films of packages of six cans. The perforations were located as shown in FIG. 1. The punch was designed with an angle A of 5 degrees and an angle B of 68 degrees. With the punch head at about 350°–360° F., 750 cans per minute or about 125 packages per minute were provided with double perforations in their .00075 inch thick polyvinylchloride film. Satisfactory horseshoe-shaped perforations were thus formed which did not tear when gripped for package carrying purposes. The packages were easily opened when desired by pulling upon the pull tabs 18 formed in the perforated areas. The beads or thickened areas 52 formed around the tabs 18 simplified the gripping of those tabs with the fingers.

It is preferred to use a release agent 54 which is formed by impregnating a hard anodized coating on the surface of the punch 26 with Du Pont's FEF Teflon (polytetrafluoroethylene). The hard anodized coating is preferably .002 inches thick and the punch 26 is preferably made from an aluminum alloy of low copper content such as alloys 6061 or 7075. Such a coating was applied to a 6061 aluminum alloy punch by Nimet Industries, Inc., of South Bend, Ind., by what is referred to as the "Nituff" process. The coating produced is file hard and functions as a release agent to prevent buildup of film on the punch. It has been found that when carbon is permitted to build up on the punch it results in an uneven melting of the film which causes a weak spot and tearing of the film at the weak spot.

The insulation used to shield the punch is preferably a material sold under the trademark "Marinite" by Johns-Manville Corporation. Marinite comprises asbestos and diatomaceous silica held together by an inorganic binder.

The use of a polytetrafluoroethylene coating which is not coupled with an anodized aluminum surface is not satisfactory because the coating per se abrades and wears off too quickly.

While presently preferred embodiments of the invention have been illustrated and described, it will be recognized that the invention may be variously embodied and practiced within the scope of the claims which follow.

What is claimed is:

1. An apparatus for perforating a generally planar film of thermoplastic material comprising:
   (a) at least one punch comprising a punch head and a substantially annular perforating surface attached to said head, said perforating surface having a leading perforating edge located substantially in a single plane offset at an angle of less than 10 but more than 3 degrees with respect to the plane of said film of thermoplastic material during the perforating operation;
   (b) means for heating said punch to a predetermined temperature, and
   (c) means for moving said punch into engagement with said film of thermoplastic material for a predetermined length of time.

2. The apparatus as defined in claim 1 wherein said annular perforating surface comprises a generally conical outer surface having a generally triangular radial cross section.

3. The apparatus as defined in claim 2 wherein said punch is insulated against heat loss.

4. The apparatus as defined in claim 3 wherein said substantially annular perforating surface is discontinuous so as to be generally of a horseshoe shape having a heel portion and a toe portion and wherein said perforating surface is attached to said punch head in such a manner that said toe portion of said horseshoe shape is the first part of said perforating surface to penetrate said film of thermoplastic material during said perforating operation.

5. The apparatus as defined in claim 4 wherein the angle between said plane containing said leading perforating edge and said plane of said film of thermoplastic material is about 5 degrees.

6. The apparatus as defined in claim 5 wherein said generally conical outer surface is substantially triangular in cross section adjacent said leading perforating edge forming an included angle at said edge of about 68 degrees.

7. The apparatus as defined in claim 6 wherein said perforating surface is coated with a release agent to prevent the accumulation of said thermoplastic material upon said surface.

8. The apparatus defined in claim 7 wherein said release agent is an anodic coating permeated with polytetrafluoroethylene.

9. The apparatus defined in claim 4 wherein said apex at said toe portion of said horseshoe shaped perforating surface is slightly blunt and wherein said apex becomes increasingly more blunt as it approaches said heel portion of said horseshoe shape.

10. The apparatus as defined in claim 4 wherein there is provided two longitudinally spaced punches, and wherein the toe portions of the horseshoe shaped perforating surfaces on said punches are pointed toward one another.

11. The apparatus as defined in claim 10 wherein said punches are yieldably mounted to said moving means so as to permit said punches to yield whenever they contact an article encapsulated within said thermoplastic material.

12. The apparatus as defined in claim 11 wherein said moving means is adapted to follow from a starting position during operation of said apparatus a moving film of said thermoplastic material and to re-cycle to said starting position.

References Cited

UNITED STATES PATENTS

| | | |
|---|---|---|
| 2,748,863 | 6/1956 | Benton. |
| 3,038,198 | 6/1962 | Schaar. |
| 3,329,053 | 7/1967 | Kleinberg _____ 83—327 XR |
| 3,355,974 | 12/1967 | Carmichael _____ 83—171 |

THERON E. CONDON, Primary Examiner

H. A. KILBY, Jr., Assistant Examiner

U.S. Cl. X.R.

83—171, 327; 264—156